US011385696B2

(12) United States Patent
Sato

(10) Patent No.: US 11,385,696 B2
(45) Date of Patent: Jul. 12, 2022

(54) ELECTRONIC APPARATUS, CONTROL METHOD IN ELECTRONIC APPARATUS, AND APPARATUS

(71) Applicant: CANON KABUSHIKI KAISHA, Tokyo (JP)

(72) Inventor: Yoshikazu Sato, Nagareyama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 165 days.

(21) Appl. No.: 16/199,826

(22) Filed: Nov. 26, 2018

(65) Prior Publication Data

US 2019/0179393 A1    Jun. 13, 2019

(30) Foreign Application Priority Data

Dec. 11, 2017    (JP) .............................. JP2017-236937

(51) Int. Cl.
    *G06F 1/28*    (2006.01)
    *G06F 1/26*    (2006.01)
    *G06F 13/40*   (2006.01)

(52) U.S. Cl.
    CPC ................ *G06F 1/28* (2013.01); *G06F 1/266* (2013.01); *G06F 13/4068* (2013.01); *G06F 2213/0042* (2013.01); *G06F 2213/3812* (2013.01)

(58) Field of Classification Search
    CPC ........ G06F 1/28; G06F 1/266; G06F 13/4068; G06F 2213/0042; G06F 2213/3812
    See application file for complete search history.

(56) References Cited

U.S. PATENT DOCUMENTS

| 5,414,260 A | 5/1995 | Takimoto |
| 9,086,868 B2 | 7/2015 | Shiba |
| | (Continued) | |

FOREIGN PATENT DOCUMENTS

| JP | 2000-041187 A | 2/2000 |
| JP | 2002-041187 A | 2/2002 |
| | (Continued) | |

OTHER PUBLICATIONS

Japanese Office Action issued in corresponding Japanese application No. 2017-236937 dated Sep. 7, 2021 (with English language translation).

(Continued)

*Primary Examiner* — Kim Huynh
*Assistant Examiner* — Eric Chang
(74) *Attorney, Agent, or Firm* — Venable LLP

(57) ABSTRACT

The electronic apparatus of the present invention includes: a power source control unit allocated to each of a plurality of external interfaces and configured to control supply or shutoff of a current for an external device and to output whether or not an overcurrent is detected as an overcurrent detection signal; a control unit configured to control supply or shutoff of a current; a logical product circuit that outputs a logical product of the overcurrent detection signals as an external interrupt signal; and an interface control unit configured to, in a case where the overcurrent detection signals is asserted, output external interface information specifying an external interface at which the overcurrent has occurred, and the control unit, in a case where the external interrupt signal is asserted, controls to the power source control unit at which the overcurrent has been detected so as to shut off supply of power.

6 Claims, 8 Drawing Sheets

(56) References Cited

U.S. PATENT DOCUMENTS

| | | | |
|---|---|---|---|
| 2015/0323979 A1* | 11/2015 | Kaestner | ............... G06F 1/266 713/323 |
| 2015/0356034 A1* | 12/2015 | Pamley | ............... G06F 13/4027 710/308 |
| 2018/0107331 A1 | 4/2018 | Sato | |

FOREIGN PATENT DOCUMENTS

| | | |
|---|---|---|
| JP | 2003-263373 A | 9/2003 |
| JP | 2013-109461 | 6/2013 |

OTHER PUBLICATIONS

Japanese Office Action issued in corresponding Japanese application No. 2017-236937 dated Feb. 15, 2022 (with English language translation).

* cited by examiner

ELECTRONIC APPARATUS, CONTROL METHOD IN ELECTRONIC APPARATUS, AND APPARATUS

BACKGROUND OF THE INVENTION

Field of the Invention

The present invention relates to a technique for controlling power (current) in an electronic apparatus having a plurality of external connection interfaces.

Description of the Related Art

Conventionally, as an interface that connects an electronic apparatus as an information processing apparatus and a peripheral apparatus, the interface of the USB (Universal Serial Bus) standard has prevailed widely. The USB standard specifies as part of the specifications thereof that it is possible to supply a power current, as bus power, to a target peripheral apparatus from an electronic apparatus (information processing apparatus), other than data communication.

Then, in a case where power (current) is supplied by the USB interface in conformity with the standard, in an electronic apparatus, in order to guarantee the operation of a peripheral apparatus, a power source capable of supplying a current (rated current) in accordance therewith is included. However, even in a case where a power source is included by supposing peripheral apparatuses to be connected, there are a variety of peripheral apparatuses and depending on the peripheral apparatus that is connected, there is a possibility that a current larger than or equal to a permitted value flows (that is, a possibility that an overcurrent occurs). Consequently, in order to protect the electronic apparatus from the overcurrent, normally, a circuit for suppressing an overcurrent (that is, overcurrent control circuit) is included.

Further, in recent years, in general, a plurality of USB ports is included as the USB interface in an electronic apparatus, and in such a case, a USB hub IC is mounted on the electronic apparatus and further, an overcurrent control circuit is incorporated in the USB hub IC that is mounted. For example, Japanese Patent Laid-Open No. 2013-109461 has disclosed a device that protects an electronic apparatus from an overcurrent by mounting a signal that detects an overcurrent and a signal necessary for controlling an overcurrent (for example, power enable signal and the like) on the USB hub IC as an overcurrent control circuit for each USB port.

However, in a case where an overcurrent control circuit (in more detail, signal for controlling an overcurrent) is incorporated in the USB hub IC as in the device of Japanese Patent Laid-Open No. 2013-109461, it is necessary to include pins (terminals) and a circuit, and therefore, there is such a problem that the manufacturing cost is raised. The present invention has been made in view of the above-described conventional problem and an object thereof is to protect an electronic apparatus from an overcurrent while suppressing the manufacturing cost of the electronic apparatus.

SUMMARY OF THE INVENTION

In order to achieve the above-described object, the present invention is an electronic apparatus including a plurality of external interfaces and capable of supplying a current to an external device connected via the external interface, the electronic apparatus including: a power source control unit allocated to each of the plurality of external interfaces and configured to output whether or not an overcurrent supplied to the external device is detected as an overcurrent detection signal, as well as controlling supply or shutoff of a current for the external device; a control unit configured to output a power source control signal for controlling supply or shutoff of a current for the external device to the power source control unit; a logical product circuit that outputs a logical product of the overcurrent detection signal output from each of the power source control units as an external interrupt signal to the control unit; and an interface control unit configured to output external interface information specifying an external interface at which the overcurrent has occurred to the control unit in a case where the overcurrent detection signal is received and one of the overcurrent detection signals is asserted, and the control unit, in a case where the external interrupt signal is asserted, outputs the power source control signal to the power source control unit having detected the overcurrent so as to shut off supply of power for the external device, as well as acquiring the external interface information.

Further features of the present invention will become apparent from the following description of exemplary embodiments with reference to the attached drawings.

DESCRIPTION OF THE EMBODIMENTS

In the following, preferred embodiments of the present invention are explained in detail with reference to the attached drawings. The following embodiments are not intended to limit the present invention and all combinations of features explained in the present embodiments are not necessarily indispensable to the solution of the present invention.

Figure 1:
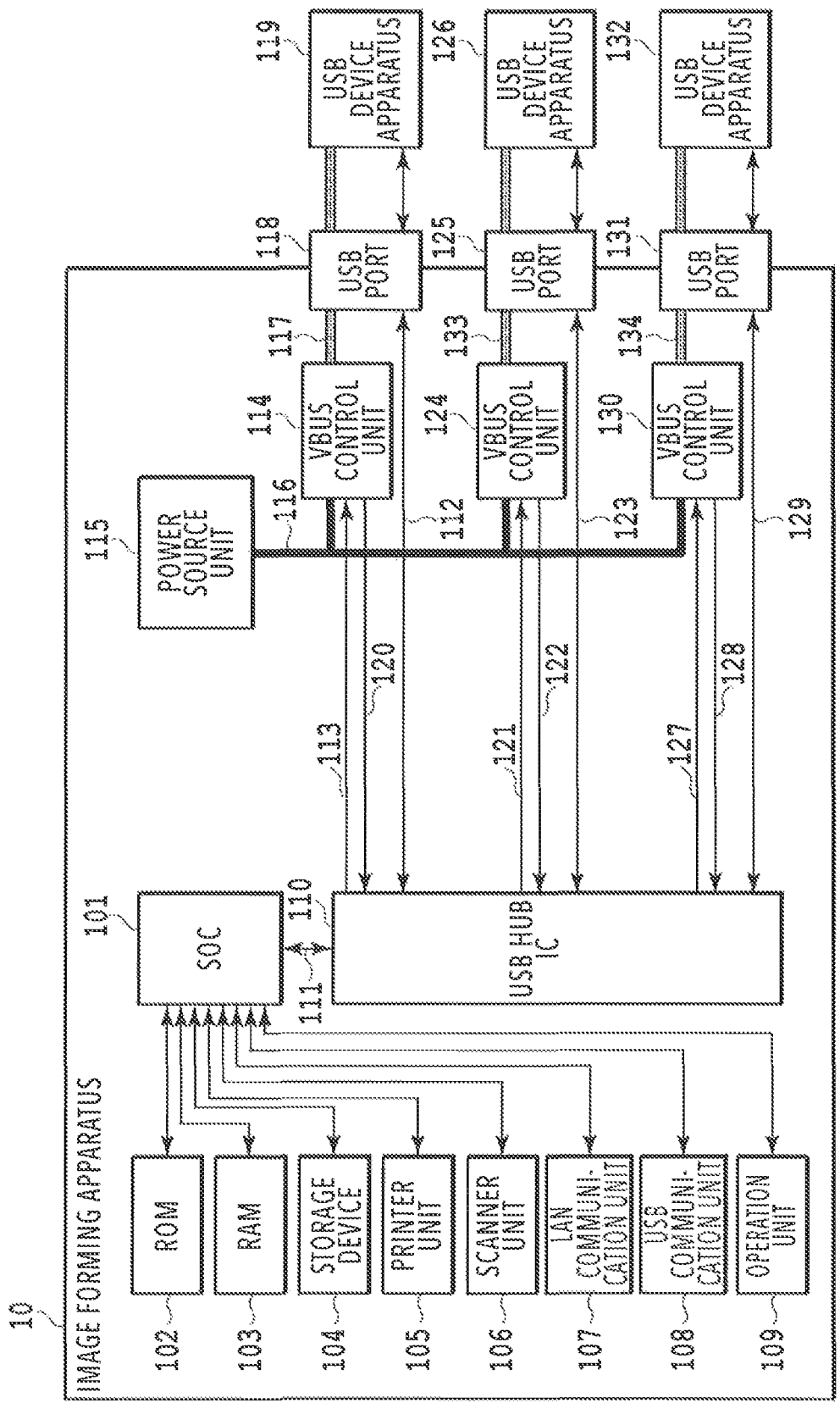
FIG. 1 is a block diagram showing a configuration of a conventional electronic apparatus.

First, before explaining the embodiments of the present invention, a power source control configuration of a conventional electronic apparatus is explained. FIG. 1 is a block diagram showing a general hardware configuration including a plurality of USB ports (that is, connection ports of the USB interface). In FIG. 1, explanation is given by using an image forming apparatus 10 including three USB ports as a general hardware configuration (electronic apparatus) including a plurality of USB ports.

The image forming apparatus 10 is a multi function peripheral (MFP) including a plurality of functions, such as a copy function and a fax function, and for example, configured as follows. An SOC (System on a Chip) 101 is a main unit internally mounting a CPU (Central Processing Unit) and configured to control the entire image forming apparatus 10, and includes a controller for controlling each unit. The SOC 101 is connected with each unit via various interfaces possessed by the SOC 101.

A ROM (Read Only Memory) 102 is a memory storing a program for activating the SOC 101, various kinds of setting information and so on. A RAM (Random Access Memory) 103 is a work memory for the SOC 101 to operate. The RAM 103 is used to save (store) image data for which image processing has been performed by execution of the operation, such as loading of various programs, storing of arithmetic operation processing results, printing, and scanning.

A storage device 104 is a nonvolatile memory for storing programs and data whose data size is large. The storage device 104 includes, for example, an HDD (Hard Disk Drive), an SSD (Solid State Drive), a flash memory and so on.

A printer unit 105 is a unit configured to operate by performing transmission and reception of image data and control signals with the SOC 101 and includes various devices relating to the printing operation, such as a photoconductor drum, a laser oscillator, a toner fixing unit, and a motor. A scanner unit 106 is a unit configured to operate by performing transmission and reception of control signals relating to the reading operation with the SOC 101 and includes various devices, such as a document detection sensor, a reading sensor, and a motor.

A LAN communication unit 107 includes a network controller and a wired LAN interface and performs network communication by connecting with an external apparatus by a LAN (Local Area Network) cable. A USB communication unit 108 includes a controller of a USB device apparatus and an interface (for example, Type B) of a USB device apparatus. The USB communication unit 108 performs communication of the USB standard by connecting with an interface (for example, Type A) of a USB host possessed by an external personal computer by a USB cable. The USB communication unit 108 is a communication unit configured to perform communication by the same USB standard as that of USB interfaces connected with a USB hub IC 110, to be described later, but those USB interfaces are different in that whether the image forming apparatus 10 corresponds to the host side or the device side, and the USB communication unit 108 corresponds to the communication unit on the device side.

An operation unit 109 receives image data for display from the SOC 101 and displays the image data on a screen and in addition, receives the operation of a user via a touch panel, a key and so on, and transmits a control signal corresponding to the operation to the SOC 101. Upon receipt of the control signal from the operation unit 109, the SOC 101 changes the image data that is displayed and performs a predetermined function (for example, copy and the like) based on the control signal.

The USB hub IC 110 is connected with the SOC 101 by the USB standard and extends the USB interface on the host side to a plurality of ports. In FIG. 1, the interface of the USB host possessed by the SOC 101 is only one port and a configuration is shown in which the interface is increased (extended) up to three ports by using the USB hub IC 110.

In FIG. 1, the communication of the USB standard between the SOC 101 and the USB hub IC 110 is indicated as a USB upstream signal 111. Further, the communication of the USB standard between the USB hub IC 110 and USB ports branched from the USB hub IC 110 is indicated as USB downstream signals 112, 123, and 129.

The USB hub IC 110 detects a device that is connected, controls the communication speed, and controls power supply to VBUS control units 114, 124, and 130 (specifically, controls enable/disable signal), in addition to increasing ports by distributing signals. In addition, signals that are output from the USB hub IC 110 and which control power supply to the VBUS control units 114, 124, and 130 are indicated as USB power source control signals 113, 121, and 127 in FIG. 1.

The VBUS control units 114, 124, and 130 are blocks that control on or off of power that is supplied from a power source unit 115 to USB ports 118, 125, and 131. The power source unit 115 converts input AC power into DC power and supplies the converted DC power to each unit of the image forming apparatus 10.

In the configuration shown in FIG. 1, power supplied to the USB ports is indicated by USB upstream power 116 on the input sides of the VBUS control units 114, 124, and 130 and USB downstream power 117, 133, and 134 on the output sides. The VBUS control units 114, 124, and 130 respectively control the supply (on or off) of power to the USB ports 118, 125, and 131 based on the USB power source control signals 113, 121, and 127 transmitted from the USB hub IC 110. For example, upon detecting that the USB power source control signals 113, 121, and 127 are changed to the enable side, the VBUS control units 114, 124, and 130 perform control so as to turn on the internal connection and supply power to the USB downstream power 117, 133, and 134. In addition, power supplied to units other than the VBUS control units 114, 124, and 130 is not the main purpose of the present invention, and therefore, it is not shown schematically and explanation thereof is also omitted.

The USB ports 118, 125, and 131 are USB connectors (Type A) for connecting an external device having a USB interface to the image forming apparatus 10. USB device apparatuses 119, 126, and 132 are USB device apparatuses capable of connecting to the USB connector (Type A). The USB device apparatuses 119, 126, and 132 are, for example, USB memories, USB card readers, portable HDDs connected via a USB cable, or the like.

Here, these USB device apparatuses consume a current that basically satisfies the standard of the image forming apparatus 10, but provided that the USB interface is possessed, it is possible to connect any USB device apparatus, and therefore, there is a case where a nonstandard USB device apparatus is connected. Then, in such a case, there is a possibility that the current (power) that is supplied enters an overcurrent state where a current larger than or equal to a permitted value of the current that the power source unit 115 can supply flows.

Consequently, also in the conventional power source control configuration, the VBUS control units 114, 124, and 130 not only control on or off of power that is supplied as their function but also detect an overcurrent in a case of the occurrence thereof and notify the USB hub IC 110 of that as an error signal. This error signal is indicated as VBUS error signals 120, 122, and 128 in FIG. 1. Upon receipt of the VBUS error signals 120, 122, and 128, the USB hub IC 110 shuts off the power supply from the VBUS control units 114, 124, and 130 by performing control so as to make the USB power source control signals 113, 121, and 127 disable. Further, in general, the threshold value of an overcurrent detected in the VBUS control units 114, 124, and 130 is designed so as to satisfy the rated current and in the conventional power source control configuration, the threshold value is set to 500 mA. In addition, the VBUS control units 114, 124, and 130 perform detection of an error other than detection of an overcurrent, shutoff of power and so on as their function, as will be explained in detail in FIG. 2.

Figure 2:
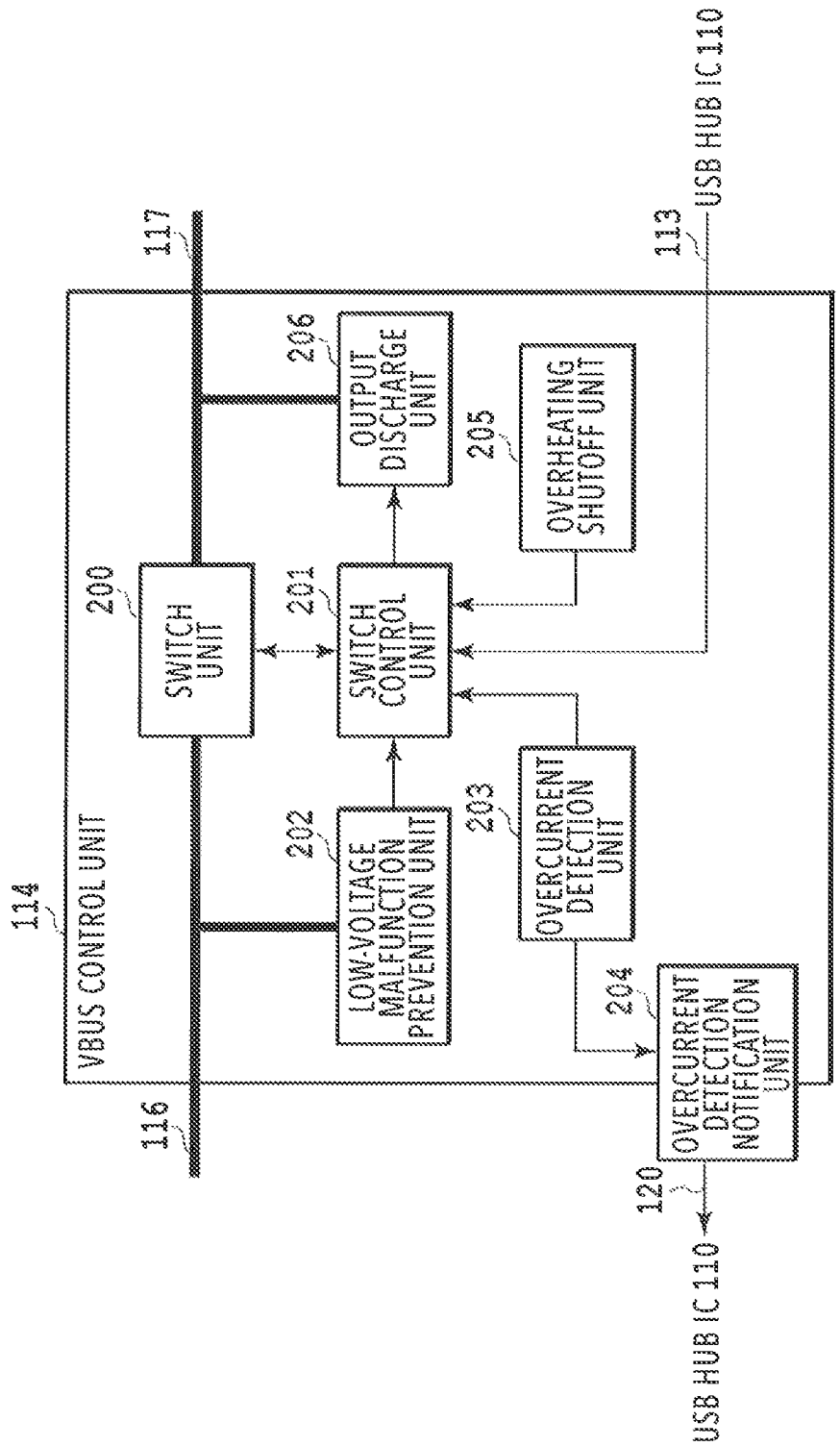
FIG. 2 is a block diagram showing a configuration of a VBUS control unit of the conventional electronic apparatus.

Next, the internal configuration of the VBUS control unit 114 in the conventional power source control configuration is explained in detail by using FIG. 2. The VBUS control units 124 and 130 have the same internal configuration as that of the VBUS control unit 114, and therefore, explanation thereof is omitted here.

A switch unit 200 is a circuit that controls conduction between the USB upstream power 116 and the USB downstream power 117 based on a control signal from a switch control unit 201. The switch unit 200 includes, for example, a switching element, such as an FET (Field Effect Transistor).

The switch control unit 201 is a circuit that generates a signal for controlling conduction of the switch unit 200 and includes, for example, a charge pump circuit and a gate logic circuit. In more detail, the switch control unit 201 controls conduction of the switch unit 200 in accordance with notifications from a low-voltage malfunction prevention unit 202, an overcurrent detection unit 203, and an overheating shutoff unit 205, to be described later, and the USB power source control signal 113. Further, in a case of performing control so as to bring the switch unit 200 into the nonconduction state, the switch control unit 201 performs discharge control of the USB downstream power 117 by notifying an output discharge unit 206 of that.

The low-voltage malfunction prevention unit 202 is a circuit that notifies, in a case where the voltage of the USB upstream power 116 is lower than or equal to a predetermined voltage value, the switch control unit 201 of that. Upon receipt of the notification that the voltage of the above-described USB upstream power 116 is lower than or equal to a predetermined voltage value from the low-voltage malfunction prevention unit 202, the switch control unit 201 performs control so as to bring the switch unit 200 into the nonconduction state.

The overcurrent detection unit 203 is a circuit that notifies, in a case where the current value of the current flowing as the USB upstream power 116 or the USB downstream power 117 is a current value larger than or equal to a predetermined threshold value, the switch control unit 201 and an overcurrent detection notification unit 204 of that. Upon receipt of the notification that a current larger than or equal to the above-described threshold value is flowing from the overcurrent detection unit 203, the switch control unit 201 limits the current flowing as the USB downstream power 117 by bringing the switch unit 200 into a semi-conduction state. As a supplement, bringing into a semi-conduction state means limiting the overcurrent supplied to the USB device apparatuses 119, 126, and 132 to less than the threshold value that is detected as an overcurrent.

The overcurrent detection notification unit 204 is a circuit that outputs the VBUS error signal 120 to the USB hub IC 110 upon receipt of the notification that a current larger than or equal to the above-described threshold value is flowing from the overcurrent detection unit 203 and includes, for example, an open drain FET and the like.

The overheating shutoff unit 205 is a circuit that notifies, in a case where the temperature of the VBUS control unit 114 becomes higher than or equal to a predetermined temperature, such as a case where an overcurrent limit state continues, the switch control unit 201 of that. Upon receipt of the notification that the temperature of the above-described VBUS control unit 114 has become higher than or equal to a predetermined temperature from the overheating shutoff unit 205, the switch control unit 201 performs control so as to bring the switch unit 200 into the nonconduction state. Upon receipt of the notification from the switch control unit 201, the output discharge unit 206 performs control so as to discharge the output power in the USB downstream power 117 and includes, for example, a switching element, such as an FET.

Figure 3:
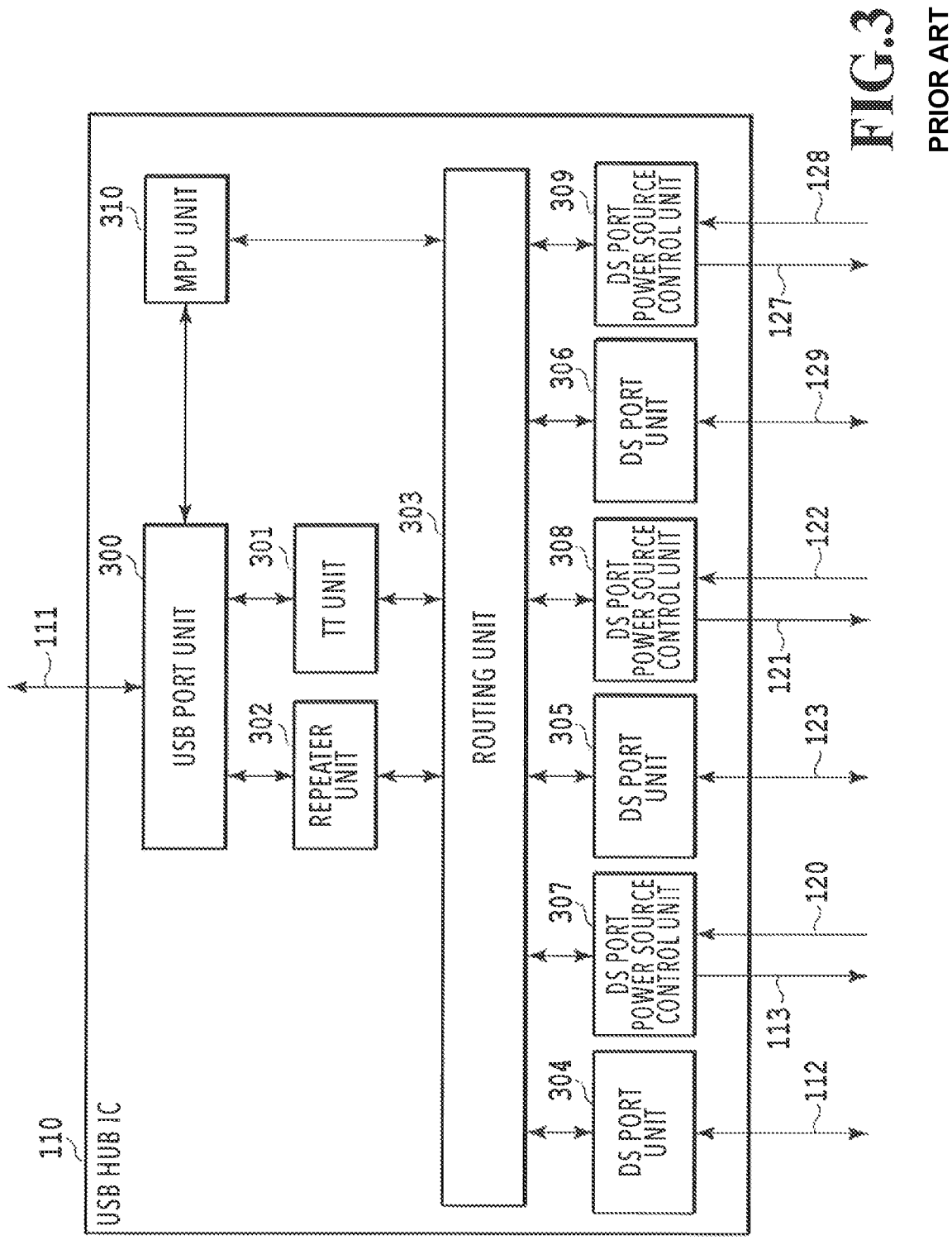
FIG. 3 is a block diagram showing a configuration of a USB hub IC of the conventional electronic apparatus.

Next, the internal configuration of the USB hub IC 110 in the conventional power source control configuration is explained in detail by using FIG. 3. A USB port unit 300 is an interface circuit in conformity with the USB standard and configured so as to be capable of upstream communication. To the USB port unit 300, as shown in FIG. 3, the USB upstream signal 111 is connected.

A TT unit 301 is a circuit called a transaction translator and performs transaction conversion processing in a case where the speed mode on the upstream side and the speed mode on the downstream side are different. Here, the speed mode refers to the High Speed mode or the Full Speed mode specified by the USB standard.

A repeater unit 302 is a circuit that controls data transfer between the upstream side and the downstream side in a case where the speed mode on the upstream side and the speed mode on the downstream side are the same. A routing unit 303 performs control so that with which DS port unit of DS port units 304, 305, and 306, data communication is performed for the USB port unit 300 (that is, performs route control). The DS port units 304, 305, and 306 are interface circuits in conformity with the USB standard and configured so as to be capable of downstream communication. As shown in FIG. 3, to the DS port units 304, 305, and 306, the USB downstream signals 112, 123, and 129 are connected, respectively.

DS port power source control units 307, 308, and 309 are circuits that generate the USB power source control signals 113, 121, and 127 transmitted to the VBUS control units 114, 124, and 130 connected to the downstream side. Specifically, the DS port power source control unit 307 performs control so as to make the USB power source control signal 113 enable or disable in accordance with a request of the SOC 101 on the upstream side. The DS port power source control units 308 and 309 similarly control the USB power source control signals 121 and 127.

Further, it is possible for the DS port power source control units 307, 308, and 309 to perform control so as to make the USB power source control signals 113, 121, and 127 disable without intervention of software control in accordance with the overcurrent occurrence notifications by the VBUS error signals 120, 122, and 128. Further, upon receipt of the overcurrent occurrence notifications by the above-described VBUS error signals 120, 122, and 128, the DS port power source control units 307, 308, and 309 notify the SOC 101 of the occurrence of an overcurrent as information via the USB upstream signal 111.

An MPU unit 310 is a circuit that sets and controls each block making up the USB hub IC 110 and includes a ROM and a RAM. As above, by using FIG. 1 to FIG. 3, the conventional power source control configuration is explained. Consequently, in the following, an electronic apparatus (power source control apparatus) according to the embodiment of the present invention is explained by using FIG. 4 to FIG. 8.

Figure 4:
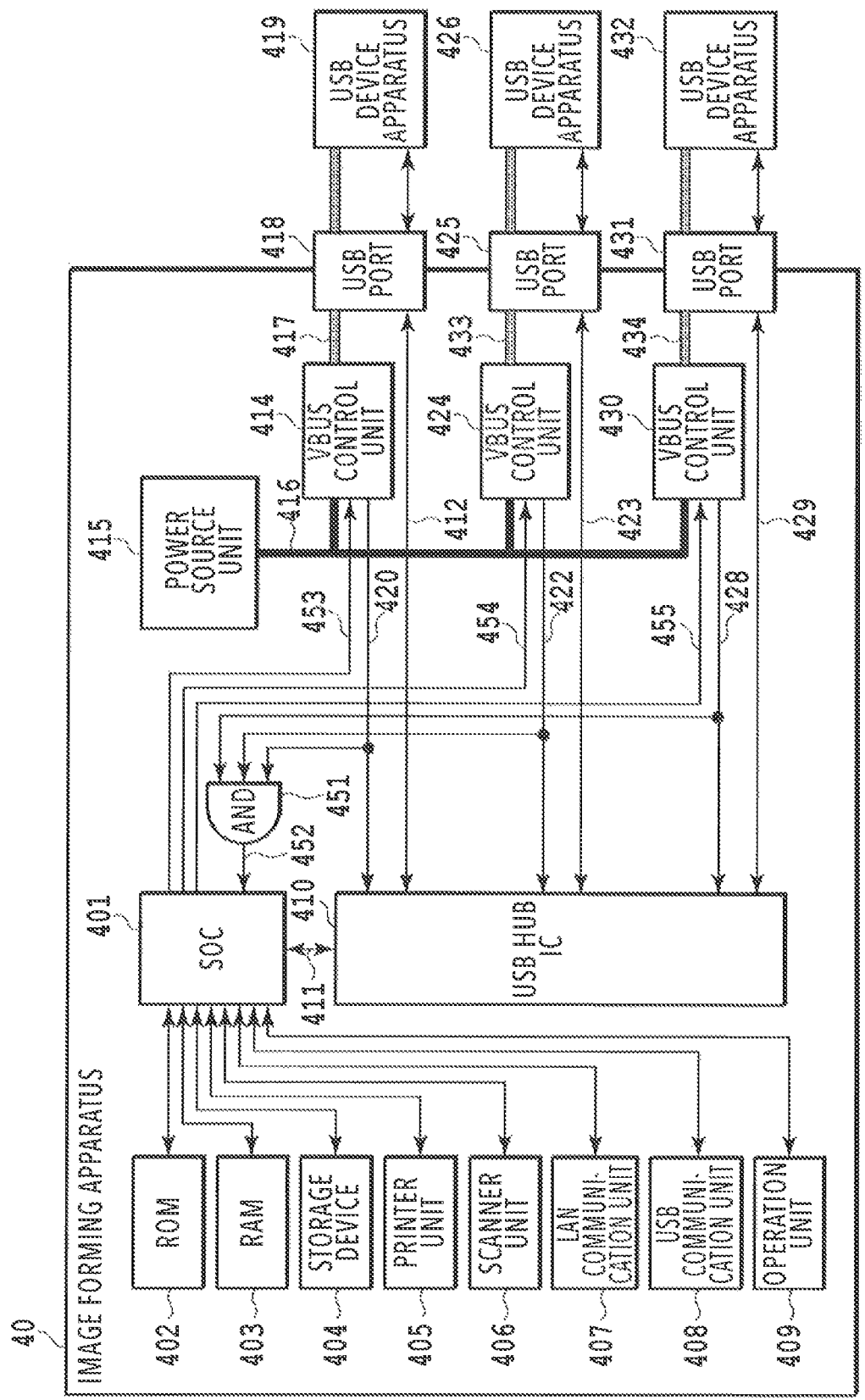
FIG. 4 is a block diagram showing a configuration of an electronic apparatus according to the present embodiment.

FIG. 4 is a block diagram showing a configuration of an electronic apparatus according to the present embodiment. As a general electronic apparatus including a plurality of external interfaces (that is, USB ports), it is possible to suppose a PC (Personal Computer) and the like, but in FIG. 4, explanation is given by using an image forming apparatus 40 including three USB ports.

The image forming apparatus 40 is a multi function peripheral (MFP) including a plurality of functions, such as a copy function and a fax function, and for example, configured as follows. A SOC 401 is a main unit internally mounting a CPU and configured to control the entire image forming apparatus 40, and includes a controller for controlling each unit. The SOC 401 is connected with each unit via various interfaces possessed by the SOC 401. Further, the SOC 401 includes general-purpose ports for outputting USB power source control signals 453, 454, and 455, to be described later.

A ROM 402 is a memory storing a program for activating the SOC 401, various kinds of setting information and so on. A RAM 403 is a work memory for the SOC 401 to operate. The RAM 403 is used to save (store) image data for which image processing has been performed by execution of the operation, such as loading of various programs, storing of arithmetic operation processing results, printing, and scanning.

A storage device 404 is a nonvolatile memory for storing programs and data whose data size is large. The storage device 404 includes, for example, an HDD, an SSD, a flash memory and so on. A printer unit 405 is a unit configured to operate by performing transmission and reception of image data and control signals with the SOC 401 and includes various devices relating to the printing operation, such as a photoconductor drum, a laser oscillator, a toner fixing unit, and a motor. A scanner unit 406 is a unit configured to operate by performing transmission and reception of control signals relating to the reading operation with the SOC 401 and includes various devices, such as a document detection sensor, a reading sensor, and a motor.

A LAN communication unit 407 includes a network controller and a wired LAN interface and performs network communication by connecting with an external apparatus by a LAN cable. A USB communication unit 408 includes a controller of a USB device apparatus and an interface (for example, Type B) of a USB device apparatus. The USB communication unit 408 performs communication of the USB standard by connecting with an interface (for example, Type A) of a USB host possessed by an external personal computer by a USB cable. The USB communication unit 408 is a communication unit configured to perform communication by the same USB standard as that of the USB interface connected with a USB hub IC 410, to be described later, but those USB interfaces are different in that whether the image forming apparatus 40 corresponds to the host side or the device side, and the USB communication unit 408 corresponds to the communication unit on the device side.

An operation unit 409 receives image data for display from the SOC 401 and displays the image data on a screen and in addition, receives the operation of a user via a touch panel, a key and so on, and transmits a control signal corresponding to the operation to the SOC 401. Upon receipt of the control signal from the operation unit 409, the SOC 401 changes the image data that is displayed and performs a predetermined function (for example, copy and the like) based on the control signal.

The USB hub IC 410 is connected with the SOC 401 by the USB standard and extends the USB interface on the host side to a plurality of ports. In FIG. 4, the interface of the USB host possessed by the SOC 401 is only one port and a configuration is shown in which the interface is increased (extended) up to three ports by using the USB hub IC 410.

In FIG. 4, the communication of the USB standard between the SOC 401 and the USB hub IC 410 is indicated as a USB upstream signal 411. Further, the communication of the USB standard between the USB hub IC 410 and the USB ports branched from the USB hub IC 410 is indicated as USB downstream signals 412, 423, and 429. The USB hub IC 410 is an interface controller (that is, interface control unit) and detects a device that is connected and controls the communication speed, in addition to increasing ports by distributing signals.

VBUS control units 414, 424, and 430 are blocks that control on or off of power that is supplied from a power source unit 415 to USB ports 418, 425, and 431. The power source unit 415 converts input AC power into DC power and supplies the converted DC power to each unit of the image forming apparatus 40.

In the configuration shown in FIG. 4, power supplied to the USB ports is indicated by USB upstream power 416 on the input sides of the VBUS control units 414, 424, and 430 and USB downstream power 417, 433, and 434 on the output sides. The VBUS control units 414, 424, and 430 respectively controls the supply (on or off) of power to the USB ports 418, 425, and 431 based on the USB power source control signals 453, 454, and 455 connected to the output port of the SOC 401. For example, upon detecting that the USB power source control signals 453, 454, and 455 are changed to the enable side, the VBUS control units 414, 424, and 430 perform control so as to turn on the internal connection and supply power to the USB downstream power 417, 433, and 434. In addition, power supplied to units other than the VBUS control units 414, 424, and 430 is not the main purpose of the present invention, and therefore, it is not shown schematically and explanation thereof is also omitted. For example, the VBUS control units 414, 424, and 430 include high-side switch circuits and the like.

The USB ports 418, 425, and 431 are USB connectors (Type A) for connecting an external device having a USB interface to the image forming apparatus 40. USB device apparatuses 419, 426, and 432 are USB device apparatuses capable of connecting to the USB connector (Type A). The USB device apparatuses 419, 426, and 432 are, for example, keyboards, USB memories, USB card readers, portable HDDs connected via a USB cable, or the like.

Here, these USB device apparatuses consume a current that basically satisfies the standard of the image forming apparatus 40, but provided that the USB interface is possessed, it is possible to connect any USB device apparatus, and therefore, there is a case where a nonstandard USB device apparatus is connected. Then, in such a case, there is a possibility that the current (power) that is supplied enters an overcurrent state where a current larger than or equal to a permitted value of the current that the power source unit 415 can supply flows.

Consequently, in the electronic apparatus according to the present embodiment, the VBUS control units 414, 424, and 430 not only control on or off of power that is supplied as their function but also detect an overcurrent in a case of the overcurrent thereof and notify the USB hub IC 410 of that as an error signal. This error signal is an overcurrent detection signal indicating where or not an overcurrent is detected and in FIG. 4, indicated as VBUS error signals 420, 422, and 428. Upon receipt of the VBUS error signals 420, 422, and 428, the USB hub IC 410 notifies the SOC 401 of the USB port at which the overcurrent has occurred or the occurrence of the overcurrent and the USB port at which the overcurrent has occurred via the USB upstream signal 411. Further, in general, the threshold value of an overcurrent that is detected in the VBUS control units 414, 424, and 430 is designed so as to satisfy the rated current and in the present embodiment, the threshold value is set to 500 mA.

An AND logic gate 451 is a logical product circuit and notifies the SOC 401 of an AND logic signal of the VBUS error signals 420, 422, and 428 as a VBUS error interrupt signal 452 (that is, notifies the SOC 401 of an AND logic signal as an external interrupt signal). The SOC 401 checks the USB port at which the overcurrent has occurred as information, which is notified via the USB upstream signal 411, with the VBUS error interrupt signal 452 as a trigger. The SOC 401 makes disable the signal corresponding to the VBUS control unit having detected the overcurrent of the USB power source control signals 453, 454, and 455 in accordance with the information specifying the USB port at which the overcurrent has occurred. In addition, the VBUS control units 414, 424, and 430 perform detection of an error other than detection of an overcurrent, shutoff of power and so on as their functions, as will be explained in detail in FIG. 5.

As above, by using the image forming apparatus 40 as the electronic apparatus according to the present embodiment, the power source control configuration thereof is explained, but the electronic apparatus is not limited to this and any apparatus having a USB host interface may be used. Consequently, the electronic apparatus may be, for example, a personal computer and the like.

Figure 5:
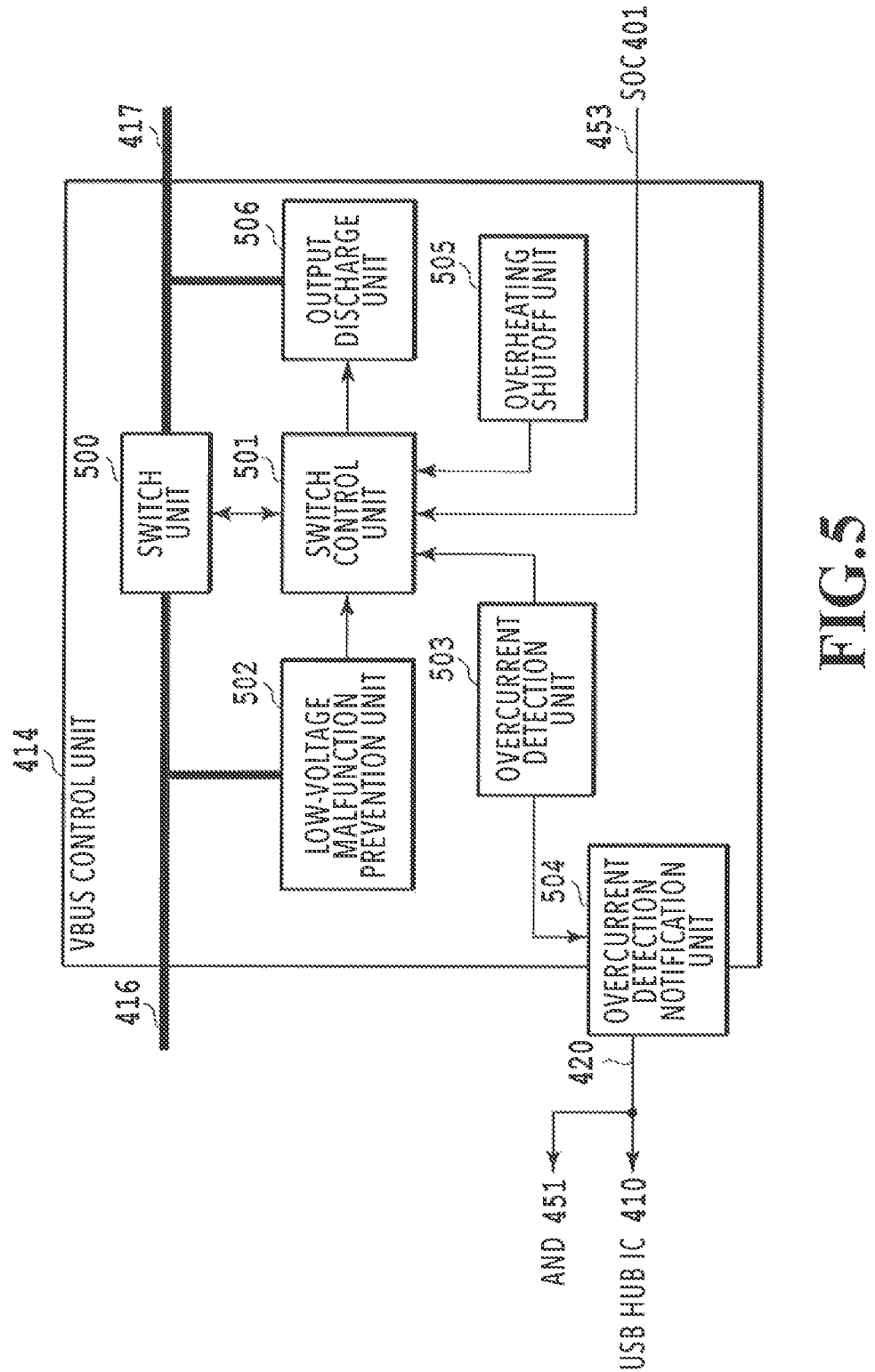
FIG. 5 is a block diagram showing a configuration of a VBUS control unit of the electronic apparatus according to the present embodiment.

Next, the internal configuration of the VBUS control unit 414 in the electronic apparatus according to the present embodiment is explained in detail by using FIG. 5. The VBUS control units 424 and 430 have the same internal configuration as that of the VBUS control unit 414, and therefore, explanation thereof is omitted here.

A switch unit 500 is a circuit that controls conduction between the USB upstream power 416 and the USB downstream power 417 based on a signal from a switch control unit 501. The switch control unit 501 includes, for example, a switching element, such as an FET.

The switch control unit 501 is a circuit that generates a signal for controlling conduction of the switch unit 500 and includes, for example, a charge pump circuit and a gate logic circuit. In more detail, the switch control unit 501 controls conduction of the switch unit 500 in accordance with notifications from a low-voltage malfunction prevention unit 502, an overcurrent detection unit 503, and an overheating shutoff unit 505, to be described later, and the USB power source control signal 453. Further, in a case of performing control so as to bring the switch unit 500 into the nonconduction state, the switch control unit 501 performs discharge control of the USB downstream power 417 by notifying an output discharge unit 506 of that.

The low-voltage malfunction prevention unit 502 is a low voltage detection unit and is a circuit that notifies, in a case where the voltage of the USB upstream power 416 (that is, input voltage) becomes lower than or equal to a predetermined voltage value, the switch control unit 501 of that. Upon receipt of the notification that the voltage of the above-described USB upstream power 416 is lower than or equal to a predetermined voltage value from the low-voltage malfunction prevention unit 502, the switch control unit 501 performs control so as to bring the switch unit 500 into the nonconduction state.

The overcurrent detection unit 503 is a circuit that notifies, in a case where the current value of the current flowing as the USB upstream power 416 or the USB downstream power 417 is a current value larger than or equal to a predetermined threshold value, the switch control unit 501 and an overcurrent detection notification unit 504 of that. Upon receipt of the notification that a current larger than or equal to the above-described threshold value is flowing from the overcurrent detection unit 503, the switch control unit 501 limits the current flowing as the USB downstream power 417 by bringing the switch unit 500 into a semiconduction state. As a supplement, bringing into a semiconduction state means limiting the overcurrent supplied to the USB device apparatuses 419, 426, and 432 to less than the threshold value that is detected as an overcurrent.

The overcurrent detection notification unit 504 is a circuit that outputs the VBUS error signal 420 to the USB hub IC 410 upon receipt of the notification that a current larger that or equal to the above-described threshold value is flowing from the overcurrent detection unit 503 and includes, for example, an open drain FET and the like.

The overheating shutoff unit 505 is an overheating detection unit and is a circuit that notifies, in a case where the temperature of the VBUS control unit 414 becomes higher than or equal to a predetermined temperature, such as a case where an overcurrent limit state continues, the switch control unit 501 of that. Upon receipt of the notification that the temperature of the above-described VBUS control unit 414 has become higher than or equal to a predetermined temperature from the overheating shutoff unit 505, the switch control unit 501 performs control so as to bring the switch unit 500 into the nonconduction state Upon receipt of the notification from the switch control unit 501, the output discharge unit 506 performs control so as to discharge the output power in the USB downstream power 417 and includes, for example, a switching element, such as an FET.

Figure 6:
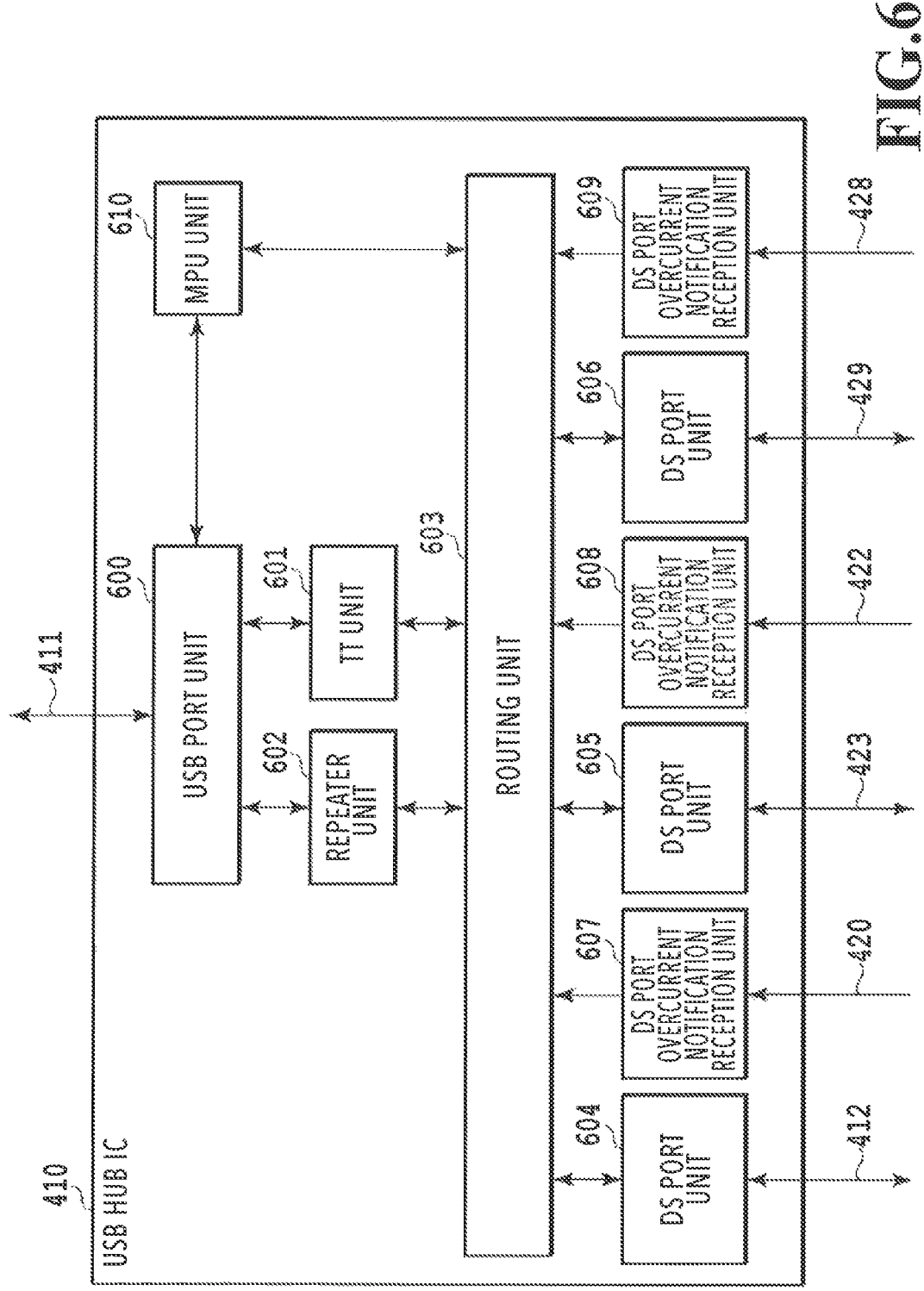
FIG. 6 is a block diagram showing a configuration of a USB hub IC of the electronic apparatus according to the present embodiment.

Next, the internal configuration of the USB hub IC 410 in the electronic apparatus according to the present embodiment is explained in detail by using FIG. 6. A USB port unit 600 is an interface circuit in conformity with the USB standard and configured so as to be capable of upstream communication. To the USB port unit 600, as shown in FIG. 6, the USB upstream signal 411 is connected.

A TT unit 601 is a circuit called a transaction translator and performs transaction conversion processing in a case where the speed mode on the upstream side and the speed mode on the downstream side are different. Here, the speed mode refers to the High Speed mode or the Full Speed mode specified by the USB standard.

A repeater unit 602 is a circuit that controls data transfer between the upstream side and the downstream side in a case where the speed mode on the upstream side and the speed mode on the downstream side are the same. A routing unit 603 performs control so that with which DS port unit of DS port units 604, 605, and 606, data communication is performed for the USB port unit 600 (that is, performs route control). The DS port units 604, 605, and 606 are interface circuits in conformity with the USB standard and configured so as to be capable of downstream communication. As shown in FIG. 6, to the DS port units 604, 605, and 606, the USB downstream signals 412, 423, and 429 are connected, respectively.

DS port overcurrent notification reception units 607, 608, and 609 receive overcurrent occurrence notifications by the VBUS error signals 420, 422, and 428. Upon receipt of the overcurrent occurrence notifications as signals, the DS port overcurrent notification reception units 607, 608, and 609 notify the SOC 401 of the USB port at which the overcurrent has occurred as information via the USB upstream signal 411. An MPU unit 610 is a circuit that sets and controls each block making up the USB hub IC 410 and includes a ROM and a RAM.

Figure 7:
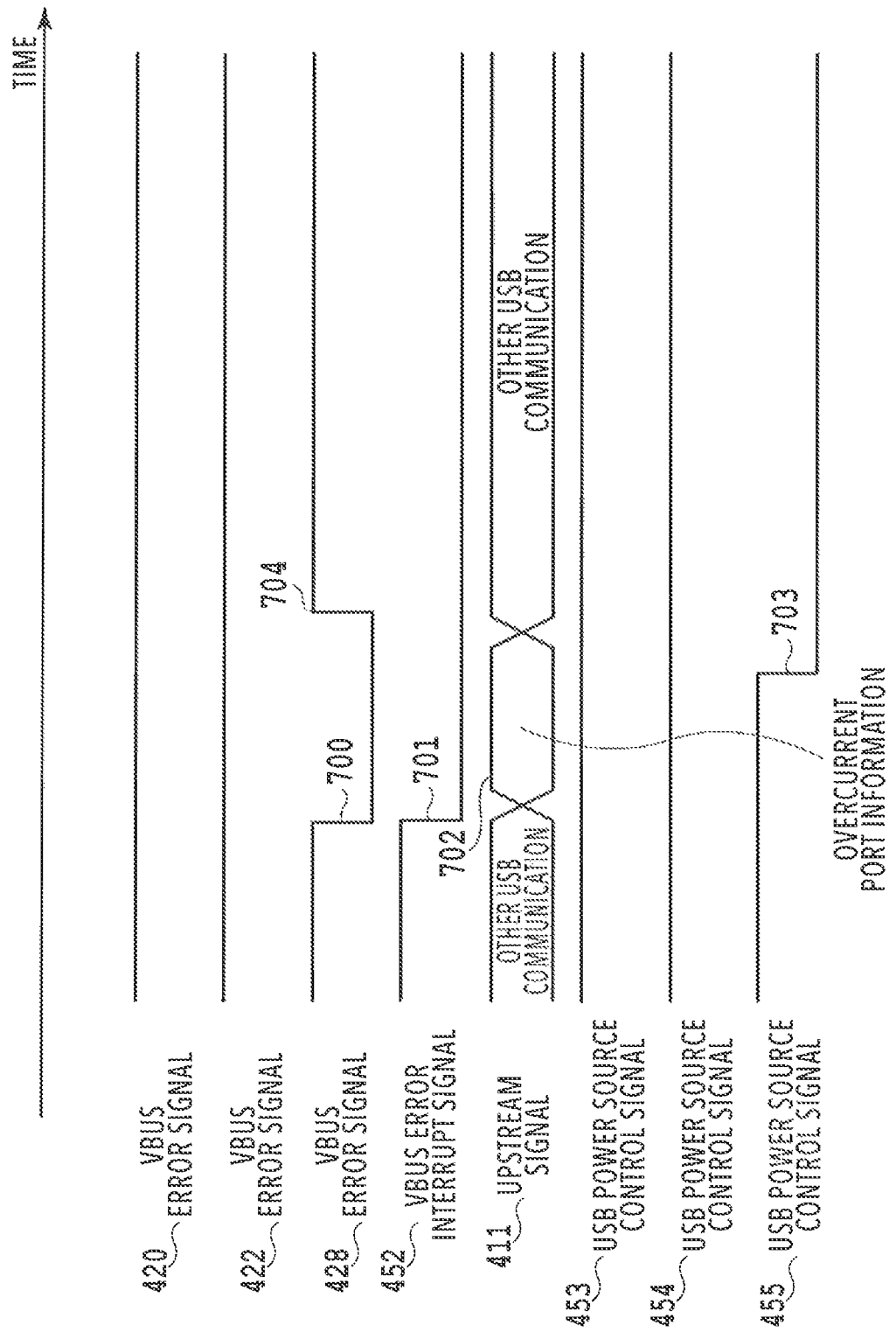
FIG. 7 is a timing chart relating to power source control of the electronic apparatus according to the present embodiment.

FIG. 7 is a timing chart relating to the power source control of the electronic apparatus according to the present embodiment and specifically, is a diagram showing processing from the occurrence of an overcurrent until the USB power source control signal is made disable by the SOC 401 as a timing chart. In FIG. 7, explanation is given on the assumption that an overcurrent has occurred at the USB port 431.

In a case where an overcurrent occurs at the USB port 431, the VBUS control unit 430 performs control so as to change the VBUS error signal 428 to the Low level (that is, asserts the VBUS error signal 428) (700). That is, the VBUS control unit 430 notifies the USB hub IC 410 that an overcurrent has occurred as a signal. In a case where the VBUS error signal 428 is output at the Low level, in accordance with the change in the level of the VBUS error signal 428, the VBUS error interrupt signal 452, which is the output of the AND logic gate 451, changes to the Low level (that is, the VBUS error interrupt signal 452 is asserted) (701).

On the other hand, upon receipt of the overcurrent occurrence notification by the VBUS error signal 428, the USB hub IC 410 notifies the SOC 401 of the USB port at which the overcurrent has occurred, that is, the USB port 431, as information via the USB upstream signal 411 (702). Further, the SOC 401 acquires overcurrent port information (702) with the change in the level of the VBUS error interrupt signal 452 (701) as a trigger. Although described later in FIG. 8, in a case where the SOC 401 is not notified of the overcurrent port information (702) by the USB hub IC 410 at the timing of the SOC 401 trying to acquire the overcurrent port information (702), the SOC 401 tries again to acquire the overcurrent port information (702).

In a case of acquiring the overcurrent port information (702) and recognizing (determining) that an overcurrent has occurred at the USB port 431, the SOC 401 shuts off the USB downstream power 434 by making disable the USB power source control signal 455 (703). After this, by the USB downstream power 434 being shut off, the USB port 431 returns from the overcurrent state, and therefore, the VBUS control unit 430 cancels the overcurrent notification in the VBUS error signal 428 (704).

Figure 8:
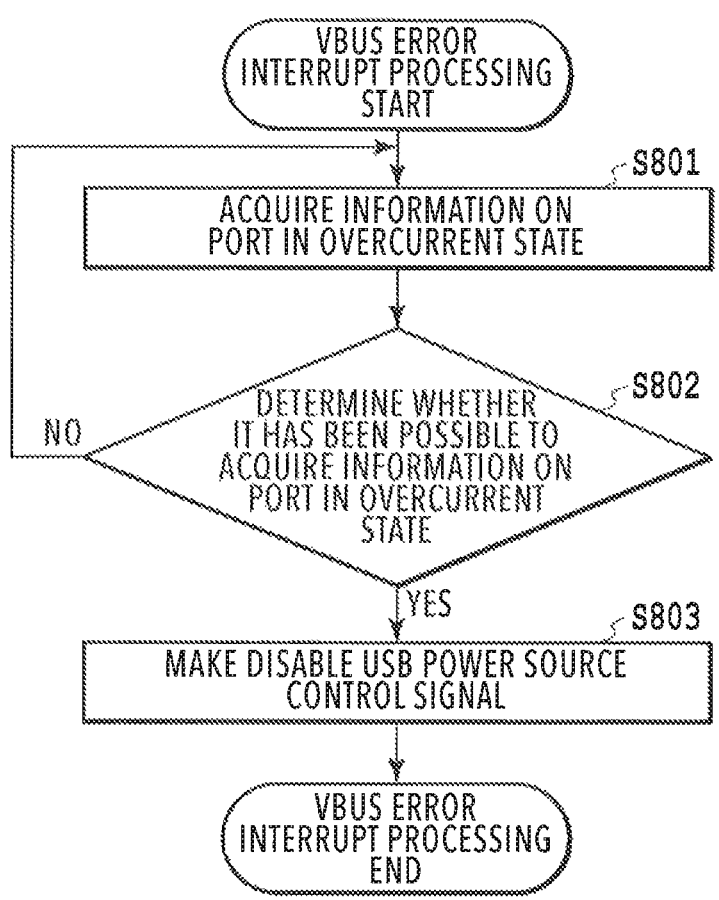
FIG. 8 is a flowchart showing a procedure of processing relating to power source control of the electronic apparatus according to the present embodiment.

FIG. 8 is a flowchart showing a procedure of processing relating to the power source control of the electronic apparatus according to the present embodiment and specifically, a flowchart showing a procedure of processing in a case where the SOC 401 detects a change in the level of the VBUS error interrupt signal 452.

Upon detecting a change in the level of the VBUS error interrupt signal 452, the SOC 401 checks the USB upstream signal 411 in order to acquire overcurrent port information with the detection as a trigger (S801). Based on the results of the check of the USB upstream signal 411, the SOC 401 determines whether or not it has been possible to acquire the overcurrent port information (S802).

In a case where the SOC 401 tries to acquire the overcurrent port information before the USB hub IC 410 reports the overcurrent port information via the USB upstream signal 411, it is not possible for the SOC 401 to acquire the overcurrent port information. Because of this, the SOC 401 returns the processing to step S801. On the other hand, in a case where it has been possible to acquire the overcurrent port information, the SOC 401 makes disable the signal corresponding to the VBUS control unit having detected the overcurrent of the USB power source control signals 453, 454, and 455 in accordance with the overcurrent port information (S803).

As above, according to the present embodiment, in a case where an overcurrent occurs at one of the USB ports, it is possible for the SOC to check the overcurrent port information (external interface information) via the USB upstream signal with the VBUS error interrupt signal as a trigger. By the SOC making disable the signal corresponding to the VBUS control unit having detected the overcurrent of the SUB power source control signals in accordance with the overcurrent port information, it is possible to protect the electronic apparatus from the overcurrent.

Further, without including a function (circuit) necessary for controlling an overcurrent in the USB hub IC (that is, while suppressing the manufacturing cost of the USB hub IC), it is possible to protect the electronic apparatus from an overcurrent for each USB port by the SOC including a general-purpose port.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, while suppressing the manufacturing cost of an electronic apparatus, it is possible to protect the electronic apparatus from an overcurrent.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-236937, filed Dec. 11, 2017, which is hereby incorporated by reference wherein in its entirety.

What is claimed is:

1. An electronic apparatus comprising a plurality of USB (Universal Serial Bus) interfaces and capable of supplying a current to a plurality of external devices connected to the plurality of USB interfaces, the electronic apparatus comprising:

a USB hub circuit that controls the plurality of USB interfaces;
a controller that controls a plurality of circuits including at least the USB hub circuit;
a plurality of power source control units connected to each of the plurality of USB interfaces in order to control power supply to an external device connected to one USB interface by a power source control unit corresponding to the one USB interface, and configured to output a detection of an overcurrent supplied to an external device as an overcurrent detection signal to the USB hub circuit via a plurality of first signal lines respectively corresponding to the plurality of power source control units;
a logic circuit that is connected to the plurality of first signal lines, connected to the controller, and controls an interrupt signal to the controller based on the overcurrent detection signal input from the plurality of first signal lines; and
a plurality of second signal lines that individually connect the controller and the plurality of power source control units,
wherein in response to receiving the overcurrent detection signal from any power source control unit out of the plurality of power source control units, the USB hub circuit acquires specifying information for specifying the power source control unit that outputs the overcurrent detection signal,
wherein based on the interrupt signal from the logic circuit, the controller acquires the specifying information transmitted from the USB hub circuit, the controller controls an output to a signal line to be in a specific output state, the signal line corresponding to the specified power source control unit out of the plurality of power source control units, so as to shut off a current to be supplied to the external device connected to the specified power source control unit, and
wherein the USB hub circuit is not capable of individually controlling the plurality of power source control units.

2. The electronic apparatus according to claim 1, wherein
each of the power source control units have an overcurrent detection unit configured to detect a current larger than or equal to a predetermined threshold value as an overcurrent in a case where the current is supplied to the external device, and
each of the power source control units perform control so as to supply a current less than the predetermined threshold value to the external device in a case where an overcurrent is detected by the overcurrent detection unit.

3. The electronic apparatus according to claim 1, wherein
each of the power source control units have a low voltage detection unit configured to detect an input voltage as a low voltage in a case where the input voltage becomes less than or equal to a predetermined voltage value, and
each of the power source control units perform control so as to shut off a current supplied for the external device in a case where a low voltage is detected by the low voltage detection unit.

4. The electronic apparatus according to claim 1, wherein
each of the power source control units has an overheating detection unit configured to detect overheating of the power source control unit, and
each of the power source control units perform control so as to shut off a current supplied for the external device in a case where overheating is detected by the overheating detection unit.

5. The electronic apparatus according to claim 1, wherein each of the power source control units has an output discharge unit configured to perform control so as to discharge output power in a case where control is performed so as to shut off a current supplied for the external device.

6. The electronic apparatus according to claim 1, wherein each of the power source control units includes a high-side switch circuit.

* * * * *